F. W. STEERE.
PURIFIER REVERSE FLOW MECHANISM.
APPLICATION FILED NOV. 4, 1918.
1,386,443.
Patented Aug. 2, 1921.
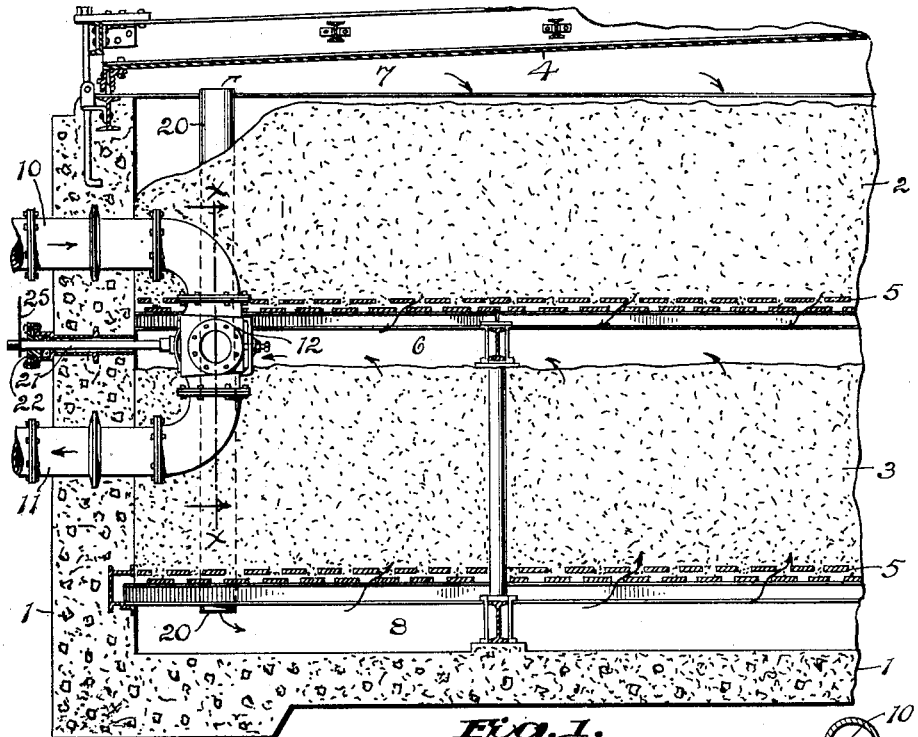
Fig.1.
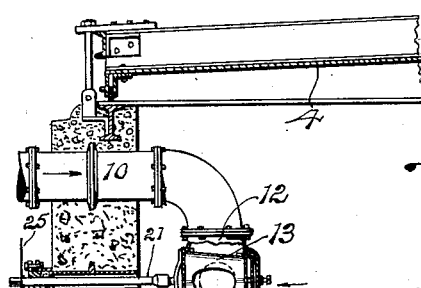
Fig.2.
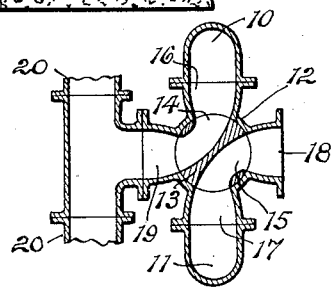
Fig.3.
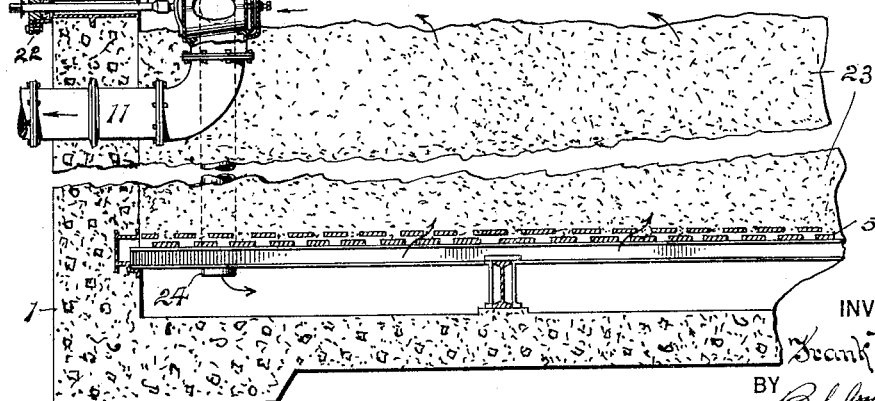
INVENTOR
Frank W. Steere
BY
ATTORNEY

UNITED STATES PATENT OFFICE.

FRANK W. STEERE, OF DETROIT, MICHIGAN, ASSIGNOR TO STEERE ENGINEERING COMPANY, OF DETROIT, MICHIGAN, A CORPORATION OF MICHIGAN.

PURIFIER REVERSE-FLOW MECHANISM.

1,386,443.  Specification of Letters Patent.  Patented Aug. 2, 1921.

Application filed November 4, 1918. Serial No. 261,123.

*To all whom it may concern:*

Be it known that I, FRANK W. STEERE, a citizen of the United States of America, residing at Detroit, in the county of Wayne and State of Michigan, have invented certain new and useful Improvements in Purifier Reverse-Flow Mechanism, of which the following is a specification, reference being had therein to the accompanying drawings.

This invention relates to means for reversing the flow of gas through purifier boxes, and its object is to simplify and cheapen the construction and also to provide an arrangement whereby the operation of reversing the gas flow is simplified and liability of mistakes eliminated. Further, a construction is provided which permits of an arrangement thereof whereby danger from leaky valves or other parts of the reversing mechanism is eliminated, the piping simplified, and a compact and efficient arrangement secured.

With these and other ends in view the invention consists in the matters hereinafter set forth and more particularly pointed out in the appended claims, reference being had to the accompanying drawing in which—

Figure 1 is a vertical section through a purifier box showing a flow reversing mechanism embodying the invention, applied thereto;

Fig. 2, a modified form of box having a single bed of purifying material and showing the flow reversing means embodied therein; and Fig. 3 is a sectional detail of a reversing valve and portions of piping attached thereto, substantially upon the line X—X of Fig. 1.

The great saving in labor and purifying material by reversing the flow of gas through the oxid beds in purifiers, is well known, and also that the capacity of any given purifier is greatly increased by such reversal. It is therefore advantageous to provide purifier boxes with means whereby the direction of flow of gas through the beds may be changed at will and quickly. The reason that some means for effecting such changes is not more generally used, is that such mechanisms are usually complicated and cumbersome. The most common methods of piping purifier boxes for reversing the flow of gas through the beds of purifying material therein have either employed by-passing and valves in the external manifold piping or so-called "center seal" valves which are connected into the manifold piping. The by-passing method results in a very cumbersome arrangement of a multiplicity of valves and piping which is not adaptable for operation by unskilled labor and is so complicated that it is very difficult to determine the effect upon the flow, of the manipulation of the valves. The "center seal" construction is also complicated in construction and therefore difficult to determine the operation, and these seals are very liable to leak, thus making them dangerous as a fire hazard and also from a sanitary standpoint.

In Fig. 1 of the drawing is shown a common form of purifier box of the divided flow type, said box 1 containing a plurality of separate beds 2 and 3 of suitable purifying material supported in spaced relation to each other and to the bottom and removable cover 4 of the box, upon suitable grids 5. The gas is usually admitted into the space 6 between the beds through a suitable inlet pipe, and dividing passes upwardly and downwardly through the beds into the spaces 7 and 8 at the top and bottom of the box, from which spaces it is conducted away through suitable outlet pipes. In such an arrangement, in order to reverse the flow, making the outlets the inlets for gas and the center inlet, the outlet, a very complicated arrangement of valves and piping outside the box has been employed heretofore, but a very compact construction which may be readily installed in the common form of box without altering materially the outside manifold piping usually employed in connection with boxes of this type and which manifold is not shown in the drawing, is secured by providing an inlet pipe 10 and an outlet pipe 11 which are connected in the usual manner to the manifold (not shown) and extend through the wall of the box near the center space 6 between the oxid beds 2 and 3. The inner ends of these pipes are connected by suitable elbows to the top and bottom sides of a valve body 12 having a tapered plug or rotatable valve member 13 seated therein and formed with two separate passages 14 and 15 therethrough connecting the top and bottom connections 16 and 17 of the body to which the pipes 10 and 11 are connected, with the side connections 18 and 19 of the body. The side connection 19 of the valve body is connected by a suitable T with a vertical pipe 20 extending upwardly and downwardly within the box alongside the valve body and opening at its upper end into the space 7 above the upper bed 2 and at its lower end into the space 8 below the lower bed 3. The outlet pipe 11 which is connected to the bottom connection 17 of the valve body communicates with the space 6 between the beds, through the passage 15 of the plug and the side connection 18 of the body which is open into said space.

The gas entering through the pipe 10 thus flows through the passage 14 of the plug, thence into the pipe 20 where it divides, part flowing upwardly into the space 7 and part downwardly into the space 8. From these spaces it passes downwardly and upwardly through the beds into the space 6 and from said space, through the passage 15 in the plug and out through the pipe 11.

By turning the plug 13 of the valve through an angle of ninety degrees, by means of a stem 21 extending outwardly through a stuffing box 22 in the side of the box, the passage 14 of the plug is caused to connect the pipe 11 with the pipe 20, and the passage 15 is brought into position to connect the pipe 10 with the open side connection 18 of the valve body. The gas then flows from the inlet pipe 10 into the center space 6 and flows therefrom through the beds in a direction reverse to that of the former flow, and from the spaces 7 and 8 it passes through the pipe 20 and out through the outlet 11 as before.

A very simple reverse flow arrangement is thus secured and the construction is such that this piping may be connected to the usual manifold provided for purifier boxes.

While the valve and vertical pipe 20 are shown as placed within the box it is obvious that they may be located outside thereof and connected into it if found desirable, but it is preferable to locate these parts as shown for the reason that if the valve or joints should leak, such leak will do no harm as the gas will escape within the box.

In Fig. 2, a purifier box of the single bed type is shown, this bed 23 being supported in spaced relation from the bottom and cover of the box by a suitable grid as before. In this box, the inlet pipe 10 and the outlet pipe 11 extend through the wall of the box near the top thereof with the valve located within the space below the cover, and the pipe 24 which is connected with the side connection 19 of the valve casing extends downward through the bed with its lower end open into the space below the bed. The reversal of flow is secured by a turning of the valve plug as before, and it is obvious that if found desirable the inlet and outlet pipes and valve may be located at the bottom of the tank instead of the top.

An indicator 25 is preferably attached to the stem 21 of the valve outside the wall of the box so that the attendant may tell at a glance whether the box is either up or down draft, and by this arrangement of piping the construction of a reversing mechanism is enormously simplified and two gate valves per box are dispensed with besides numerous fittings and considerable piping. Also a very great advantage is that through the simpler piping and indicator, the operator may tell at a glance the sequence of the boxes and whether they are up or down draft. Further this reversing valve may be utilized in connection with any installation now in service of either the single or divided flow type, as the inlet and outlet connections are always the same, and as the cross-sectional area of the gas passage through the valve is not reduced and the lines of flow are such as to reduce the loss of pressure to the minimum, the gas will flow through the reversing mechanism at the same pressure as in a construction provided with no such means.

What I claim is:—

1. In combination with a purifier box having a bed of purifying material therein with a space at each side of said bed, of an inlet and an outlet for the box, a conduit communicating with the space at one side of said bed, and a valve for controlling the communication of said inlet and outlet with the space at the other side of said bed and with said conduit.

2. In combination with a purifier box having a bed of purifying material therein with a space at each side of said bed, of an inlet and an outlet communicating with the space at one side of the bed, a conduit communicating with the space at the other side of the bed, and a single valve for controlling communication of the inlet and outlet with said space at one side of the bed and with the space at the other side of the bed through said conduit.

3. In combination with a purifier box having a bed of purifying material therein, of a gas inlet and a gas outlet for the box adjacent each other, and manually operable means intermediate and common to said inlet and outlet for reversing the direction of flow of the gas through said bed.

4. In combination with a purifier box having a bed of purifying material therein, of a gas inlet and a gas outlet opening through a common wall of the box, and manually operable means intermediate and common to said inlet and outlet and contained wholly within the box for reversing the direction of flow of the gas through said bed, and means extending outside the box for operating said means.

5. In combination with a purifier box having a bed of purifying material therein, of a single inlet pipe and a single outlet pipe for said box, and single manually operable means connecting said pipes for reversing the direction of flow of the gas through said bed without reversing the flow in said inlet and outlet pipes.

6. In combination with a purifier box having a bed of purifying material therein, of an inlet pipe and an outlet pipe extending into the box, means located wholly within said box and connecting said pipes for conducting gas from the inlet to either side of said bed and from either side of said bed to said outlet, and means for controlling the flow of gas through said connecting means and reversing the direction of flow of the gas through said bed without reversing the flow in said inlet and outlet pipes.

7. In combination with a purifier box having a bed of purifying material therein and provided with an inlet and an outlet, of means for conducting gas from the inlet to either side of said bed and to the outlet from either side of said bed, and a single manually operable controlling member for reversing the flow through said conducting means.

8. In combination with a purifier box having a bed of purifying material therein, of an inlet and an outlet for said box, means for conducting gas from the inlet to either side of said bed and to the outlet from either side of said bed, and a single controlling valve common to said inlet and outlet for changing the direction of flow through said means.

9. In combination with a purifier box having a bed of purifying material, of an inlet and an outlet for said box, and means for controlling the flow of gas from the inlet to either side of the bed and for controlling the flow of gas from either side of the bed to the outlet, said means being manually operable to change the flow from the inlet, from one side of the bed to the other, and simultaneously change the flow to the outlet, from one side of the bed to the other.

10. In combination with a purifier box having a bed of purifying material therein, of an inlet and an outlet for said box, opening through one and the same wall thereof, means for conducting gas to or from one side of the bed, means for conducting gas to or from the other side of said bed, and manually operable means common to said inlet and outlet for connecting either conducting means with either the inlet or outlet.

11. In combination with a purifier box having a bed of purifying material therein, of an inlet and an outlet communicating with the interior of said box through a common wall thereof and at one side of said bed, a conduit communicating at one end with the other side of the bed, and at its opposite end with said inlet and outlet and means operable for controlling the communication of said conduit with said inlet and outlet.

12. In combination with a purifier box having a bed of purifying material therein, of an inlet and an outlet communicating with the interior of said box at one side of said bed, a conduit in the box extending through the bed, and a valve operable for connecting said conduit with either the inlet or outlet.

13. In combination with a purifier box having a bed of purifying material therein, of an inlet pipe and an outlet pipe for said box, a conduit extending through the bed of material in the box, a valve casing in the box to which said inlet and outlet pipes and said conduit are connected and opening into the box at one side of said bed, and a valve in said casing for connecting either the inlet or the outlet with either the said conduit or said opening in the casing.

14. In combination with a purifier box having a plurality of beds for purifying material therein, of inlet and outlet pipes for said box, a valve casing in said box between said beds connecting said pipes and having an opening open into a space between the beds, a conduit in the box connected to said casing and extending through the beds, a valve member in the casing for connecting either the inlet or the outlet with either said opening or said conduit, and a valve stem on the valve extending outside the box for operating the valve.

In testimony whereof I affix my signature in the presence of two witnesses.

FRANK W. STEERE.

Witnesses:
J. McPhail, Jr.,
W. C. Woodland.